United States Patent [19]

Marshall

[11] Patent Number: 5,103,624

[45] Date of Patent: Apr. 14, 1992

[54] METHOD AND MEANS FOR SWEEPING STALKS FROM FURROWS ONTO RIDGES AND SHREDDING SAME

[76] Inventor: James W. Marshall, Rte. 3, Box 202, Cozad, Nebr. 69130

[21] Appl. No.: 637,197

[22] Filed: Jan. 3, 1991

[51] Int. Cl.[5] ............................................. A01D 50/00
[52] U.S. Cl. ....................................... 56/192; 56/504; 460/112; 460/113; 172/45; 172/176
[58] Field of Search ................ 56/192, 500, 502, 504, 56/505, 344, 365, 370; 460/111, 112, 113; 172/63, 45, 176, 181

[56] References Cited

U.S. PATENT DOCUMENTS

| | | | |
|---|---|---|---|
| 2,762,287 | 9/1956 | Greiman | 97/188 |
| 2,949,719 | 8/1960 | Van Der Lely et al. | 56/193 |
| 2,974,888 | 3/1961 | Everett | 241/191 |
| 3,005,637 | 10/1961 | Hetteen | 275/3 |
| 3,136,556 | 6/1964 | Wilkes et al. | 172/45 |
| 3,247,911 | 4/1966 | Erickson | 172/510 |
| 3,357,467 | 12/1967 | Morkoski | 146/117 |
| 3,678,671 | 7/1972 | Scarnato | 56/505 |
| 3,718,191 | 2/1973 | Williams | 172/196 |
| 3,884,020 | 5/1975 | Dahl et al. | 56/320.2 |
| 4,135,351 | 1/1979 | Akgulian | 56/255 |
| 4,137,923 | 2/1979 | Deuffel et al. | 460/112 |
| 4,142,589 | 3/1979 | Schlagenhauf | 172/510 |
| 4,189,904 | 2/1980 | Paker | 56/255 |
| 4,306,409 | 12/1981 | Wulfers | 56/320.2 |
| 4,485,878 | 12/1984 | Uken | 172/510 |
| 4,550,122 | 10/1985 | David et al. | 172/158 |
| 4,591,002 | 5/1986 | Meinert | 172/510 |
| 4,618,004 | 10/1986 | Howard | 172/176 |
| 4,624,197 | 11/1986 | Drake | 172/63 |
| 4,690,224 | 9/1987 | Shwez | 172/45 |
| 4,785,890 | 11/1988 | Martin | 172/29 |

FOREIGN PATENT DOCUMENTS

| | | | |
|---|---|---|---|
| 571859 | 3/1959 | Canada | 172/45 |
| 824756 | 12/1959 | United Kingdom | 172/63 |

Primary Examiner—Terry Lee Melius
Attorney, Agent, or Firm—Zarley, McKee, Thomte, Voorhees & Sease

[57] ABSTRACT

A three-point hitch furrow sweep and trash shredder are positioned with the furrow sweep being centered over the furrows for moving stalks onto the ridges where they are acted upon by the shredders. The shredders include a rotor in a housing having a plurality of pivotal hammers which work upon the trash and drive the trash through a perforated screen which reduces the size of the trash particles and returns it to the ground. The furrow sweeps include a pair of coulters in back to back oppositely facing relationship centered over the center line of the furrows or a single coulter for each furrow. The counters may be staggered or positioned in back to back relationship and may be flat or concave in shape.

27 Claims, 3 Drawing Sheets

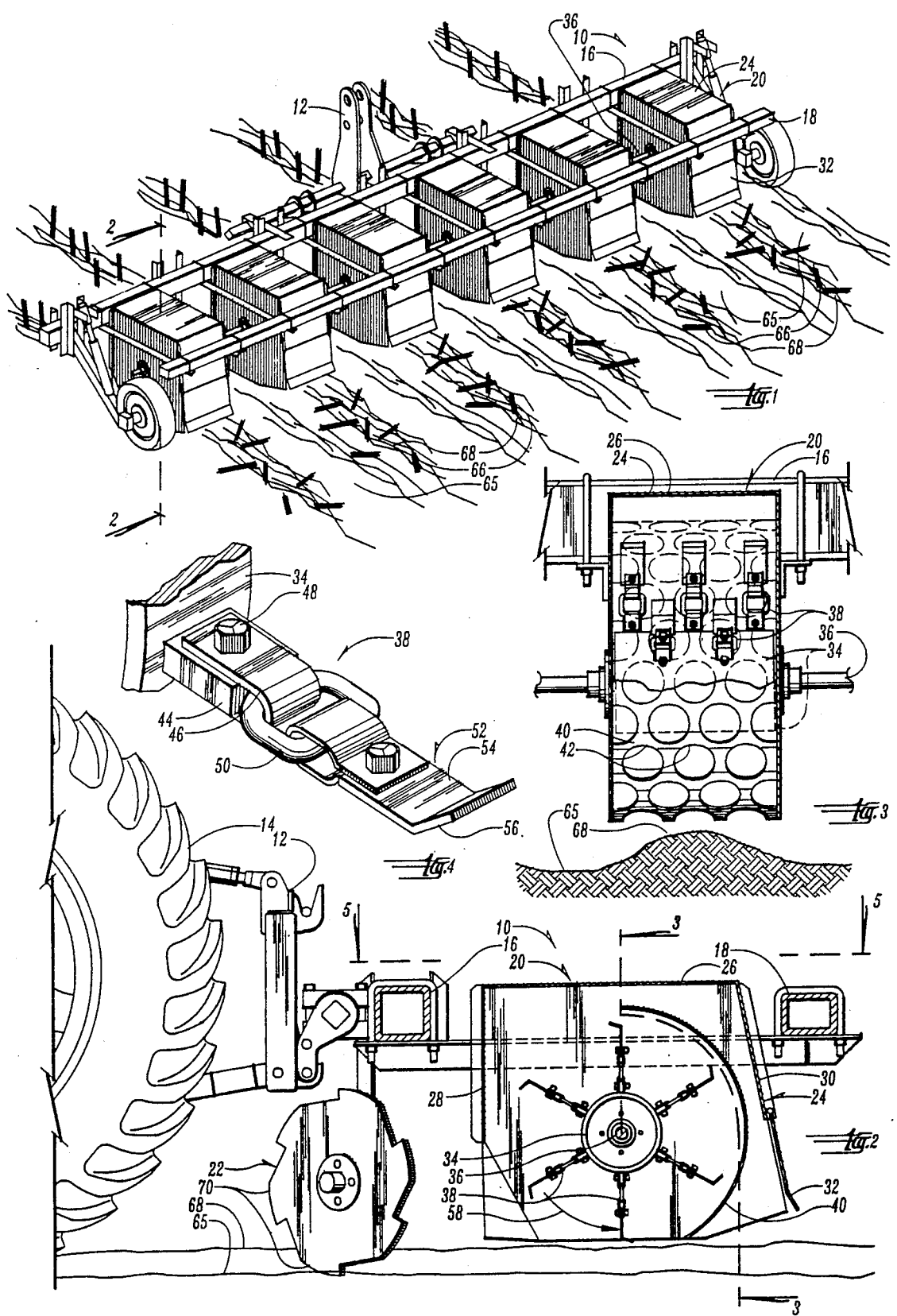

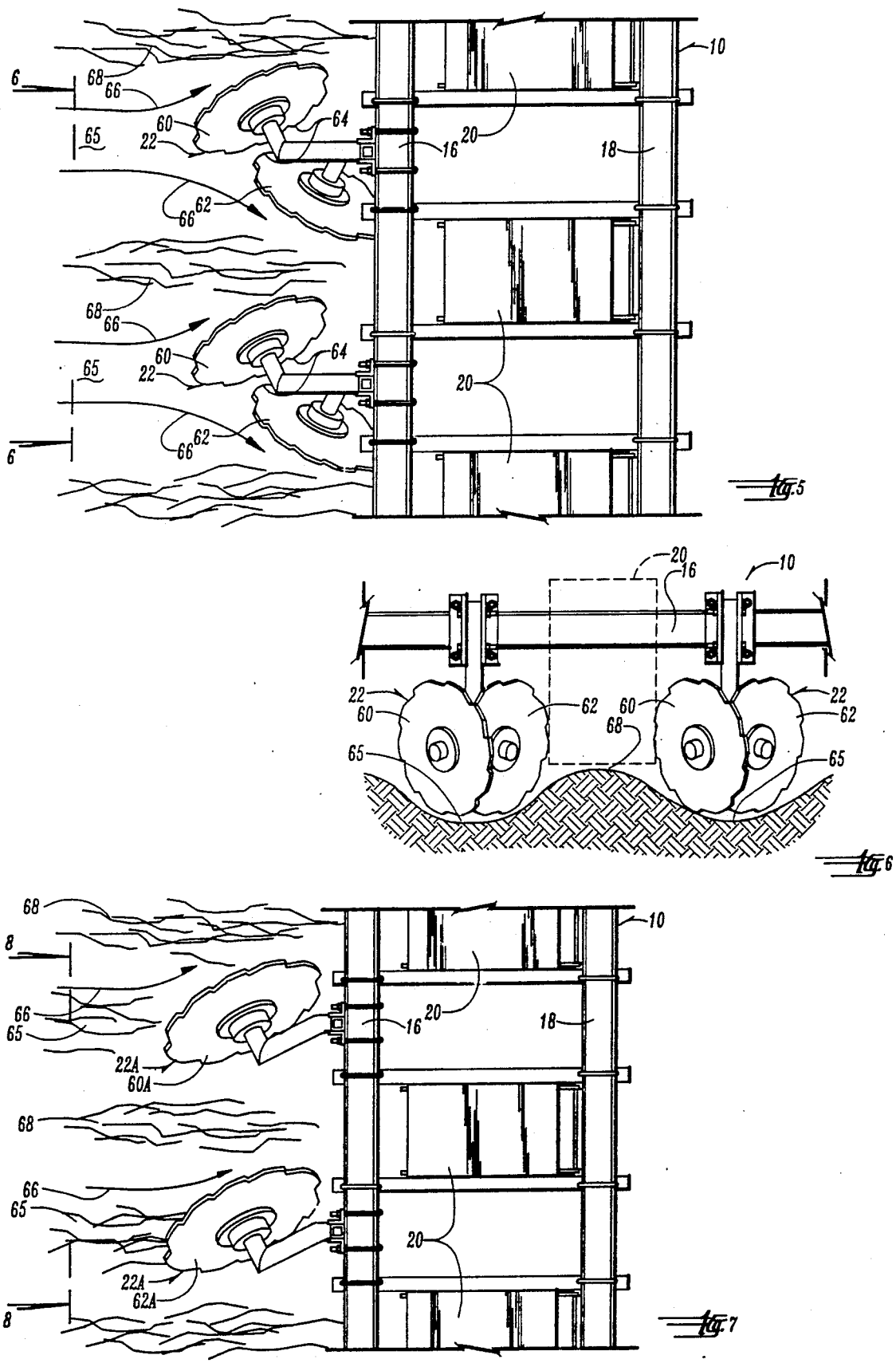

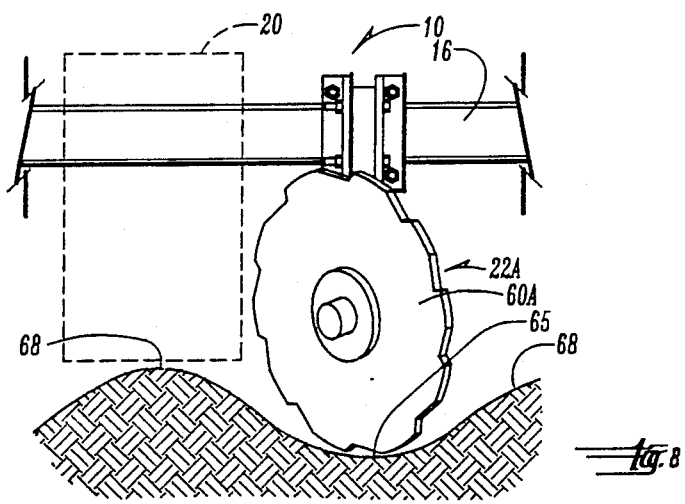
_fig. 8_
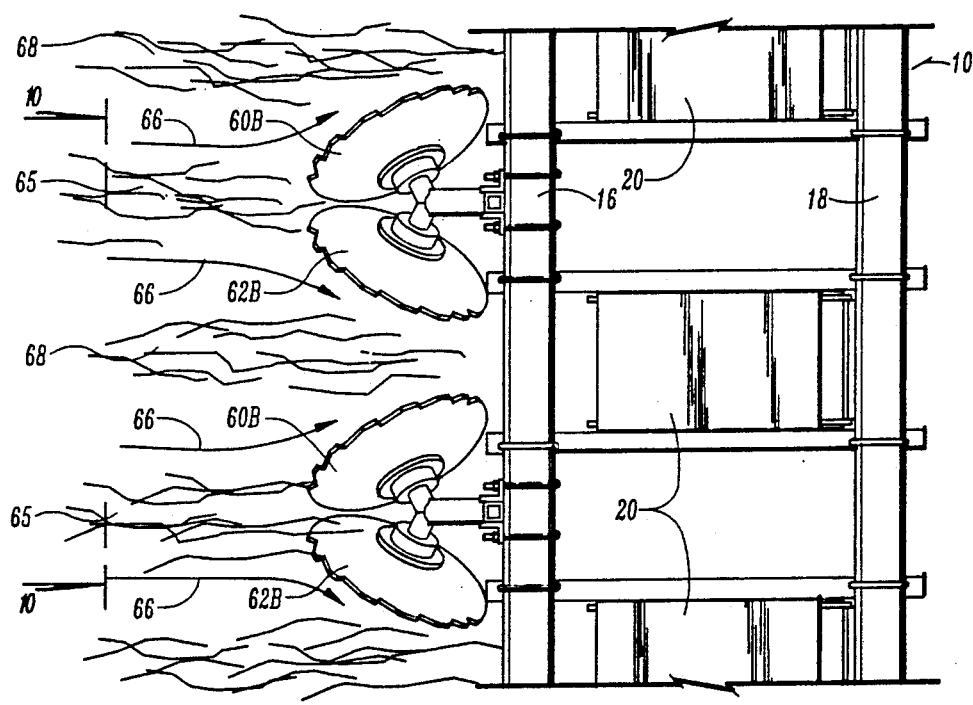
_fig. 9_
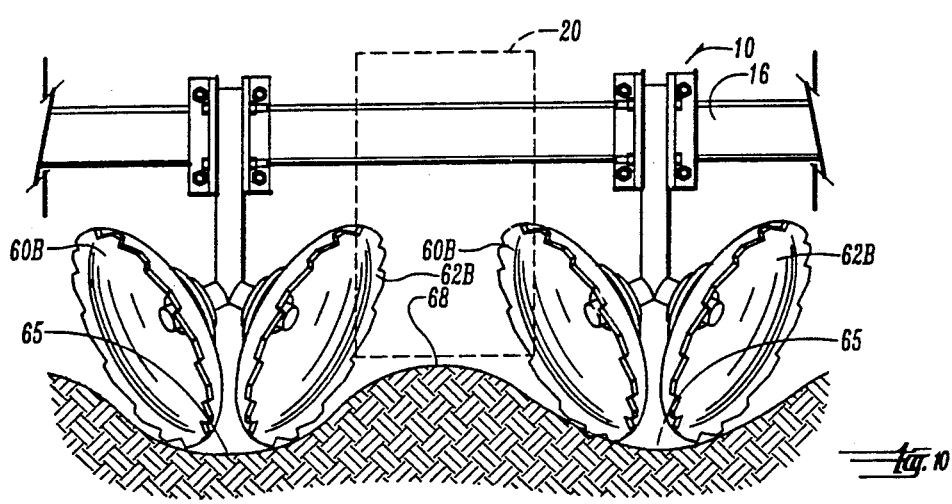
_fig. 10_

5,103,624

METHOD AND MEANS FOR SWEEPING STALKS FROM FURROWS ONTO RIDGES AND SHREDDING SAME

BACKGROUND OF THE INVENTION

This invention relates to stalk shredders and furrow sweeps which may be used alone or in combination.

The typical stalk shredder will involve a blade rotating about a vertical axis in a housing which chops the stalks into smaller pieces and returns them to the ground. The stalk shredder will cover the entire row and in the case of ridge farming will cover both the ridge and the furrow as the stalks in the furrow will be left for the shredder to act upon them as it passes over them.

It is thus an object of this invention to provide furrow sweeps for moving the stalks from the furrows onto the ridges where a stalk cutter moving along the ridges can act upon the collected debris and reduce it to smaller sized pieces. A further object is to maximize the shredding while minimizing the energy requirements for operating the shredder.

SUMMARY OF THE INVENTION

The stalk shredder of this invention which may be used alone or in combination with furrow sweeps includes a housing in which a perforated screen is mounted. A rotor carrying a plurality of spaced apart pivotal hammers operates on the stalks fed into the shredder driving them into and through the perforated screen thereby reducing their particle size. The shredded stalks are then returned to the ground. The hammers may include knives or dull hammer heads.

The furrow sweeps may be one of several different embodiments. In one embodiment a pair of sweeps include coulters which are angled outwardly to the line of travel and are centered with their bottom edges over the center line of the furrow whereby trash in one half of the furrow is moved to the adjacent ridge on one side and trash in the other half of the furrow is moved to the adjacent ridge on the other side. The coulters may be back to back or staggered along the length of the furrow. Another furrow sweep embodiment includes a single coulter for each furrow whereby all debris is swept onto a single ridge from each furrow. The coulters may be flat or concave in shape with the convex surfaces facing each other.

Thus is it seen in the preferred embodiment that the furrows are swept clean of stalks which are moved onto the adjacent ridges whereupon they are shredded to smaller pieces by being forced by hammers on a rotating rotor through a perforated screen.

DESCRIPTION OF THE FIGURES

FIG. 1 is a perspective view of a furrow sweep and shredder machine in operation in a field having ridges and furrows.

FIG. 2 is a cross sectional view through one of the shredder units taken along line 2—2 as seen in FIG. 1.

FIG. 3 is a cross-sectional view taken along line 3—3 in FIG. 2.

FIG. 4 is a fragmentary perspective view of a hammer mounted on a rotor.

FIG. 5 is a fragmentary top plan view taken along line 5—5 in FIG. 2.

FIG. 6 is a fragmentary elevational view taken along line 6—6 in FIG. 5.

FIG. 7 is a view similar to FIG. 5 but showing an alternate furrow sweep embodiment.

FIG. 8 is a front elevational view taken along line 8—8 in FIG. 7.

FIG. 9 is a top plan view similar to FIG. 5 but showing a further alternate sweep embodiment.

FIG. 10 is a front elevational view taken along line 10—10 in FIG. 9.

DESCRIPTION OF THE PREFERRED EMBODIMENT

The furrow sweep and stalk shredder of this invention is referred to generally by the reference numeral 10 in FIG. 1 and includes a three-point hitch frame 12 for mounting on a tractor 14. The frame 12 includes a pair of laterally extending front and rear frame members 16 and 18 which support shredder units 20 rearwardly of furrow sweeps 22.

The shredder unit 20 includes a housing 24 having a top wall 26, a forward wall 28 and a rear wall 30 to which a pivotal gate 32 is attached at its lower edge. A rotor 34 is mounted on a shaft 36 and carries a plurality of hammers 38 spaced around the rotor in rows of two and three as seen in FIG. 3.

An arcuate perforated screen 40 is positioned outwardly of the hammers 38 and includes openings 42 through which stalks and other debris are forced when acted upon by the rotating hammers 38 whereupon they are returned to the ground in reduced size.

The hammers 38 include a handle lug 44 rigidly connected to the rotor 34 and in turn have a U-shaped strap 46 connected thereto by a bolt 48. A link 50 is pivotally connected to the strap 46 and in turn has a plate hammer head 52 pivotally connected on its opposite side as seen in FIG. 4. The plate head 52 has a first straight portion 54 and an outwardly free end angled portion 56. As seen in FIG. 2 the angled portion 56 extends in the direction of rotation as indicated by the arrow 58 which is in the direction of rotation of the shredder as it moves forwardly along the ground.

The furrow sweeps 22 may be arranged in several different ways. As seen in FIGS. 2, 5 and 6 a pair of coulters 60 and 62 are angled in opposite directions and staggered along the line of travel while being positioned over the center of a furrow 64. The coulters 60 and 62 have bottom edges 65 which engage the ground at the center line of the furrow 64. As the sweeps 22 move forwardly to the left as seen in FIG. 5, the debris 66 is moved from the furrow 64 to the ridges 68 where the trash is then acted upon by the shredders 20.

In the embodiment of FIGS. 7 and 8 the furrow sweep 22A includes a single coulter 60A angled to the line of travel and positioned over the center of the furrow 64 for sweeping the trash 66 onto ridge 68. An adjacent second coulter 62A alone cleans the adjacent furrow 64 and sweeps trash onto the adjacent ridge 68. The size of the coulter and angle will be varied as required by the furrow and ridge spacing.

In FIGS. 9 and 10 a third furrow sweep embodiment is shown which is similar to that of FIGS. 5 and 6 except that the coulters 60B and 62B are back to back rather than staggered and are dish or cup shaped with their convex sides facing each other.

Thus it is seen in operation that the shredder units 20 are driven by a suitable power source such as a power take off on the tractor while furrow sweeps 22 are either powered or rotate by engagement with the ground through teeth 70 as seen in FIG. 2 causing rotation as the coulters roll over the ground. The spacing of the shredders 20 and the furrow sweeps 22 on the frame members 16 and 18 will be appropriate to the spacing of the ridges 68 and furrows 64 such that the shredders 20 are directly over the ridges 68. The size of the openings or holes 42 in the screen 40 will vary with the material being shredded, speed of rotation and other conditions.

I claim:

1. A stalk shredder comprising,
   a housing carried on a frame,
   a rotor in said housing including a plurality of hammers spaced around said rotor,
   a perforated screen spaced outwardly of said rotor, and
   power means for rotating said rotor whereby stalks in said housing are driven by said hammers into and through the perforations in said screen thereby shredding said stalks.

2. The structure of claim 1 wherein said hammers are pivotally mounted on said rotor.

3. The structure of claim 2 wherein said hammers include a link making them flexible.

4. The structure of claim 1 wherein said rotor is rotated in the same direction as said stalk shredder is moved.

5. The structure of claim 1 wherein said hammers include a handle rigidly connected to said rotor, a link pivotally connected to said handle and a hammer head pivotally connected to said link at an outer free end of said hammer.

6. The structure of claim 5 wherein said hammer head is a plate having a first portion connected to a second outer portion disposed at angle to said first portion.

7. The structure of claim 1 wherein said housing includes front and rear sides and an inlet is provided on said front side and an outlet is provided on the rear side with said perforated screen being positioned between said rotor and said outlet.

8. The structure of claim 1 wherein a furrow sweep is carried on said frame forwardly of said stalk shredder for feeding stalks into said stalk shredder.

9. The structure of claim 8 wherein said furrow sweep is one of a pair of furrow sweeps mounted on said frame forwardly of said stalk shredder and on opposite sides for feeding stalks into said stalk shredder from opposite sides thereof.

10. The structure of claim 9 wherein said stalk sweeps are further defined as being coulters disposed at an angle to the line of travel of said stalk shredder over the ground.

11. The structure of claim 1 wherein said stalk shredder is one of a plurality of stalk shredders on said frame spaced apart and adapted to move over spaced apart stalks on ridges between a pair of furrows, a pair of sweeps positioned forwardly of said stalk shredders adapted to move in said furrows for feeding stalks onto said ridges and into said stalk shredders.

12. The structure of claim 11 wherein said pair of sweeps are adapted to be positioned in the same furrow and feed stalks onto oppositely disposed side by side ridges.

13. The structure of claim 11 wherein said pair of sweeps are each adapted to be positioned in different furrows with each sweep feeding stalks onto a different ridge.

14. The structure of claim 12 wherein said pair of sweeps are further defined as being flat coulters.

15. The structure of claim 12 wherein said pair of sweeps are further defined as being concave outwardly and convex inwardly.

16. The structure of claim 15 wherein said pair of sweeps have lower edges positioned closely adjacent each other and are adapted to be positioned over the center line of a furrow.

17. The structure of claim 10 wherein said pair of coulters are in back to back relationship.

18. The structure of claim 17 wherein each of said coulters are concave in shape and are positioned with the convex back sides being in back to back relationship.

19. The structure of claim 10 wherein said pair of coulters are staggered along a line parallel to the line of frame travel over the ground.

20. The method of sweeping stalks from furrows onto adjacent ridges and shredding same, comprising the steps of,
   providing a frame on which a plurality of shredders and furrow sweeps are carried,
   positioning said sweeps and shredders in lateral spaced relationship with said sweeps over said furrows and said shredders over said ridges, and
   moving said frame over the ground parallel to said furrows and ridges with said furrow sweeps sweeping said stalks onto said ridges and said shredders shredding said stalks.

21. The method of claim 20 wherein the step of providing said shredder further includes providing shredders that have a housing, a rotor in the housing, and a plurality of hammers pivotally connected to said rotor with a perforated screen positioned outwardly therefrom, where upon rotation of said rotor stalks are driven against and through said screen thereby reducing their size.

22. The method of claim 20 wherein the step of providing said sweeps on said frame includes providing a pair of outwardly and oppositely facing coulters angled to the line of travel having their bottom edges centered over a furrow center line with one of said coulters moving stalks in one direction onto an adjacent ridge and the other of said coulters moving stalks in the opposite direction on to a ridge adjacent said other of said coulters.

23. The method of claim 20 wherein the step of providing said sweeps on said frame includes providing a single coulter angled to the line of travel centered over each furrow for moving the stalks in each furrow onto a single adjacent ridge.

24. The method of sweeping stalks from furrows onto adjacent ridges comprising the steps of,
   providing a frame on which a plurality of furrow sweeps are carried,
   positioning said sweeps in lateral spaced relationship with said sweeps over said furrows, and
   moving said frame over the ground parallel to said furrows and ridges with said furrow sweeps sweeping said stalks onto said ridges.

25. The method of claim 24 wherein the step of providing said sweeps on said frame includes providing a pair of outwardly and oppositely facing coulters angled to the line of travel having their bottom edges centered over a furrow center line with one of said coulters moving stalks in one direction onto an adjacent ridge and the other of said coulters moving stalks in the opposite direction on to a ridge adjacent said other of said coulters.

26. The method of claim 24 wherein the step of providing said sweeps on said frame includes providing a single coulter angled to the line of travel centered over each furrow for moving the stalks in each furrow onto a single adjacent ridge.

27. The method of claim 24 wherein the step of providing a plurality of furrow sweeps on said frame further includes providing a pair of furrow sweeps centered over a furrow center line of each furrow with one of said sweeps moving stalks in one direction onto an adjacent ridge and the other of said sweeps moving stalks in the opposite direction on to a ridge adjacent said other of said sweeps.

* * * * *